United States Patent
Carper

(10) Patent No.: US 6,338,435 B1
(45) Date of Patent: Jan. 15, 2002

(54) SMART CARD PATCH MANAGER

(76) Inventor: Todd Carper, 19672 Stevens Creek Blvd., Cupertino, CA (US) 95014

( * ) Notice: Subject to any disclaimer, the term of this patent is extended or adjusted under 35 U.S.C. 154(b) by 0 days.

(21) Appl. No.: 09/386,289

(22) Filed: Aug. 31, 1999

Related U.S. Application Data

(60) Provisional application No. 60/116,243, filed on Jan. 15, 1999.

(51) Int. Cl.[7] ............................. G06K 19/00; G06K 7/00
(52) U.S. Cl. ........................................ 235/487; 235/492
(58) Field of Search .................. 235/492, 380, 235/375, 382, 441, 487, 493; 380/23, 29

(56) References Cited

U.S. PATENT DOCUMENTS

| | | | |
|---|---|---|---|
| 4,727,244 A | * 2/1988 | Nakano et al. | 235/380 |
| 5,070,233 A | * 12/1991 | Takizawa et al. | 235/380 |
| 5,310,999 A | * 5/1994 | Claus et al. | 235/384 |
| 5,542,081 A | 7/1996 | Geronimi | 395/800 |
| 5,805,869 A | * 9/1998 | Smith et al. | 395/507 |
| 5,901,303 A | * 5/1999 | Chew | 395/400 |

OTHER PUBLICATIONS

A copy of the PCT international Search Report from related filing PCT/US00/00083.

* cited by examiner

Primary Examiner—Thien M. Le

(57) ABSTRACT

The present invention provides a system and method for patching ROM based programming in a smart card. By means of a ROM management record and a ROM management record address indicator, patch code downloaded to and installed in read/write memory may be used to completely replace ROM based programming code.

20 Claims, 4 Drawing Sheets

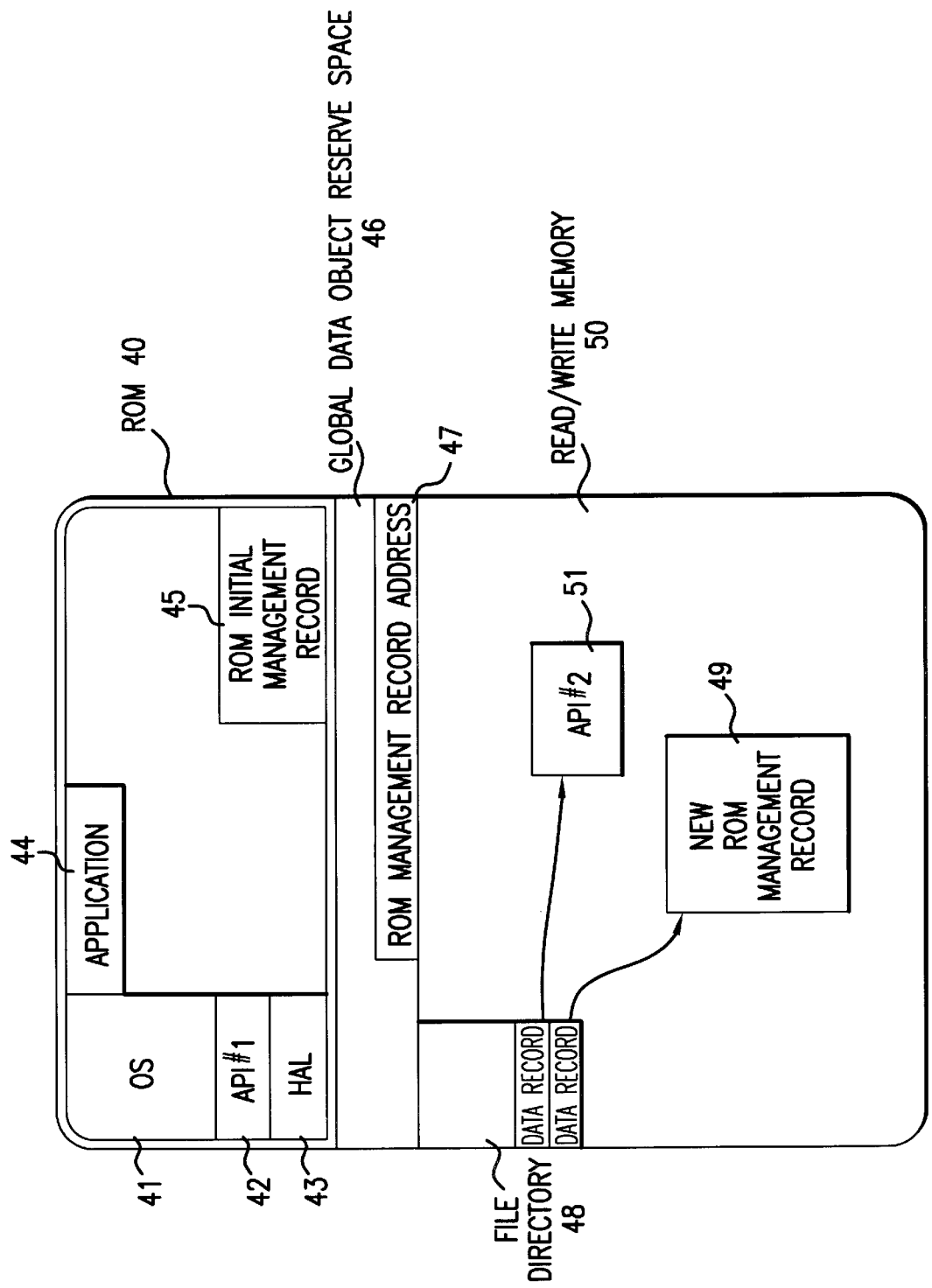

SMART CARD PATCH MANAGER

CROSS REFERENCE TO RELATED APPLICATION(S)

This application claims the benefit of U.S. Provisional Application No. 60/116,243 filed Jan. 15, 1999.

FIELD OF THE INVENTION

The present invention relates to the field of portable tokens, such as smart cards. More particularly, the present invention relates to a smart card capable of effectively correcting or amending ROM based programming. Such correction may be done in the field through non-secure medium.

BACKGROUND OF THE INVENTION

Most consumers are familiar with credit cards, debit cards, and automatic teller machine (ATM) cards. Such cards are increasingly used to access, transfer and spend money. The back of these cards includes a magnetic strip storing encoded information about the cardholder and the account(s) accessible by the card. Terminals, including ATMs and merchant "point-of-sale" terminals, read the encoded information from the card and access the cardholder's account to complete a transaction.

Besides the well-known credit and debit cards, stored value cards are becoming increasingly popular. Stored value cards are purchased or issued with a specific monetary value. When the cardholder desires to use the stored value card to purchase goods or services, the card is presented at the point of sale and the cost of the goods or services is deducted from the value of the card. The cardholder may continue to use the stored value card in this manner until all the value has been removed from the card. The card may then be discarded, or its value may be replenished. Such cards are commonly used to pay subway fares or to make long distance phone calls.

For many types of transactions, however, the current trend is away from credit/debit cards and stored value cards, and into a class of devices generally called smart cards. Rather than employing information encoded on a magnetic strip, smart cards include a microprocessor and a memory element embedded within a credit card size device. With a microprocessor, smart cards are able to interact with terminals across a broader range of transactions, and are able to communicate a broader, and a more detailed range of information regarding the cardholder, a cardholder account, transaction authorization, or other information.

The term "smart card" is used throughout as a convenient name for a broad class of devices sometimes referred to as portable tokens. Smart cards are the most common present form of portable tokens, but as will be seen hereafter the actual physical form of the portable token, as well as the specific means by which the portable token communicates data to the outside world are not the subject of the present invention.

Smart cards have been used in various applications for some time. FIG. 1 shows an exemplary smart card 10. Roughly the size of a credit card, smart card 10 includes a microprocessor 12 with an integral memory element, and conductive contacts 13. Microprocessor 12 is typically a single wafer integrated circuit mounted on, or embedded within the otherwise plastic smart card. Conductive contacts 13 interface with a terminal to electrically transfer data between the terminal and the smart card. Other embodiments of the smart card do not include conductive contacts 13. Such "contactless" smart cards receive information via proximately coupling, such as magnetic coupling, or via remote coupling, such as radio communication.

The microprocessor 12 and conductive contacts 13 of FIG. 1, are shown in some additional detail in FIG. 2. Conductive contacts variously include power contacts, at least one input/output (I/O) port, a reset port, and a clock (clk) signal port. Microprocessor 12 comprises a central processing unit (CPU) 21 which is generically control logic including I/O circuitry 23. Terminal signals variously interface with CPU 21 through the conductive contacts 13 and I/O circuitry 23. Microprocessor 12 is associated with a memory element 20. The "memory" may be formed on the same integrated circuit as the microprocessor, or may be formed on a separate device. Generally, the memory includes Random Access Memory (RAM) 22, Read Only Memory (ROM) 24, and Read/Write (R/W) Memory 26, such as Electrically Erasable Programable Read Only Memory (EEPROM). However, some or all of these presently-used memory elements may be replaced by battery backed-up RAM, flash memory, or other electronic data storage media.

Operating power, a user input keypad, and a display for the smart card microprocessor are typically provided by a terminal. The term "terminal" broadly indicates any device exchanging information with a smart card using any number of data transfer means. A computer, ATM, merchant point-of-sale device, or security control device, are present examples of terminals.

The terminal nominally includes a mechanism detecting the presence of a properly positioned smart card. Upon detecting the smart card, the terminal provides power to the microprocessor, and typically sends a reset (RST) signal to the smart card. The smart card uses the RST signal to reset itself, or to initiate an internal reset function. After reset, the smart card returns an answer-to-reset (ATR) signal to the terminal. The ATR signal communicates basic information concerning the smart card to the terminal. Once such basic information is successfully recognized by the terminal, communication, i.e., data transfer, between the smart card and the terminal can be established.

Smart cards can be programmed to operate as stored value cards, credit cards, debit cards, ATM cards, calling cards, personal identity cards, critical record storage devices, etc. In these varied capacities, a smart card may, at least in theory, be designed to use a number of different application programs. In actual practice, however, an inability to readily develop applications has limited the type and number of applications placed on the conventional smart card. In fact, most conventional smart cards include only a single application, or at most a single type of application.

This is not surprising when one considers that from a programming perspective, conventional first generation smart cards are little more than an embedded application. Looking at FIG. 3A, such first generation cards can be viewed as an application 30 stored in memory which runs a set of microprocessor-specific instructions on hardware resources 32. The term "hardware resources" is used to generically indicate the memory and logic circuits, with their associated interfaces, used to execute microprocessor instructions but may also include I/O circuits, power circuits, and the other hardware. Given the structure shown in FIG. 3A, each application must be written in a very low level, or machine level language. This language is specific to the microprocessor on which the application is intended to run.
}

The first generation, embedded application programming model offers at least one significant advantage—programming flexibility. Microprocessors are typically able to execute a significant set of instructions. Since an embedded application is written at the machine level, the full range of the microprocessor's instructions set may be accessed and utilized by the application.

Unfortunately, such programming flexibility comes at a high price. In order to run an existing application on a different microprocessor, it must often be completely rewritten. Debugging, updating, and testing of embedded applications are arduous. Further, machine level programming is difficult and requires a great deal of hardware specific expertise. Embedded programmers are, thus, hard to find and expensive to retain. All of these factors combine to restrict the number and quality of smart card applications. Further, the hardware specific nature of the resulting applications contributes to the incompatibility problems which characterize conventional smart cards.

Such conventional smart cards do not employ a true operating system. Rather, a specific application written according to the microprocessor instruction set is stored in ROM and executed in accordance with commands received from a terminal. MPCOS, VisaCash, GSM, and Proton are examples of such first generation embedded applications.

A true operating system does not execute commands received from the outside world. Thus, in the context of a smart card, a true operating system will not (is unable to) execute commands received from a terminal. Rather, an operating system serves as a conduit and router for commands communicated from a terminal to an application stored on the smart card. Additionally, an operating system serves as a conduit through which an application utilizes the hardware resources. In other words, an operating system provides I/O functions and provides other functionality to applications running on the OS. Since first generation smart cards store only the application code, and since this code must necessarily execute commands received from the terminal, first generation smart cards do not include an operating system.

In an attempt to overcome the difficulties, limitations and expense associated with the programing of first generation smart cards, second generation smart cards incorporate an interpreter. An interpreter can be thought of as a library of commands. JAVA and BASIC are common interpreters. A set of commands is defined and identified in the interpreter, any one of which may be "called" by an application. The term "call" or "calling" is used throughout to broadly describe a relationship between two pieces of code in which one piece invokes the other. Commands, functions, definitions and instructions may be used by having one piece of code call other pieces of code. The foregoing pieces of code may reside within the an application or the OS.

Conceptually, an interpreter 33 can be thought of residing between application 30 and hardware resources 32, as shown in FIG. 3B. Thus, an application running on a second generation smart card gains access to the hardware resources only through the interpreter which converts a command into one or more microprocessor instructions.

The interpreter effectively provides a higher level of abstraction and a programming language reflecting this level of abstraction with which a broader class of programmers may effectively write applications. However, the definition of commands by the interpreter, which promotes programming efficiency and standardization, necessarily restricts programing flexibility, since an interpreter will never define the entire range of commands theoretically made possible by an unrestricted combination of the microprocessor instructions. Thus, by use of an interpreter, programming flexibility is traded away for programming ease and standardization. The use of an interpreter also slows program execution since commands must be converted into microprocessor instructions before execution.

Further, since conventional smart cards implement the file structure defined by ISO-7816, part 4, the use of an interpreter comes as an additional penalty to programming flexibility. That is, ISO-7816, part 4 already confines an application programmer to a certain command set used to define a standard file architecture. On top of this restriction, the interprete further confines the programmer to another fixed set of commands. If a particular functionality is not defined by a command in the interpreter's library, the functionality can not be implemented within an application.

For example, if some new smart card application desired the function of outputting data to a printer, this function could not be implemented if the interpreter lacked the necessary command, such as a "PRINT" command associated with desktop computers. Such functional inabilities attributable to the interpreter are particularly exasperating where a sequence of microprocessor instructions might be designed to implement the desired "new" function, but where the programmer lacks access to the microprocessor instruction set because of the obligatory presence of the interpreter.

To date, smart cards have failed to realize much of their inherent potential. Such failure stems, at least in part, from the restricted nature of smart card applications, many of which are little more than custom, embedded applications. The use of a "standard" file architecture, such as ISO-7816, part 4, and the use of static interpreters aids in the development of smart card applications, but does so at the price of programming flexibility.

By their present nature, conventional smart cards store some, if not all, programming in ROM. For example, conventional first generation smart cards store the embedded application in ROM. Second generation smart cards store the interpreter program, as well as typically storing application programs in ROM.

Unfortunately, conventional smart cards provide no real opportunity to significantly change or modify ROM based programming once smart cards are fielded. This presents a real problem to smart card issuers, since operating/programming errors and oversights, collectively and generically called "bugs," are continually identified following release of any smart card. Historically, severe bugs could only be remedied by physically replacing smart cards in the field with new cards having an improved version of the application. Card issuers and users generally learn to live with less severe bugs.

Attempts have been made to avoid these unpleasant alternatives by utilizing the EEPROM portion of smart card memory. U.S. Pat. No. 5,542,081 allows "filter instructions" to be placed in the ROM based application which index an address in EEPROM. The EEPROM address thus allows subsequent programming steps to be grafted into the existing application stored in ROM. This additional filtering approach does create a mechanism of sorts for mitigating the effects of bugs, but it does not actually correct the errant code generating the bug.

For example, assume a program as written in ROM creates a data object D by performing steps A and then C. In effect, A+C=D. After issuing smart cards with this program, the issuer identifies an error in the program in relation to the creation of data object D. The remedy for this error requires that D be created by steps A, then B, and then C, i.e., (A+B)+C=D. The conventional filtering approach would first create an "incorrect" D according to the ROM based program, and thereafter delete the incorrect data object D, and then re-create D using the EEPROM based steps identified in the filtering instructions.

One can readily see that the filtering approach is very inefficient, and for more than one or two minor fixes results in a tangled mess of code. Not surprisingly, while this inefficient filtering approach to correcting a ROM based application works well enough for smart cards running a single application, it would not work for a smart card running multiple applications from different vendors.

The historic inability to securely modify or upgrade existing smart card programming in the field is just one reason why smart cards have failed to realize their full commercial potential. Many other reasons exist. Prominent among these reasons is the absence of a "true" operating system (OS) supporting applications from multiple vendors.

Even where limited modification or upgrading to fielded smart card programming can be accommodated in the conventional smart card, the physical process of reprogramming must be performed in a "trusted" device. That is, a terminal controlled by the smart card issuer must used to reprogram the smart card application in order to ensure code integrity. This is true because conventional smart cards, in and of themselves, do not have the processing capability or sophistication to verify new programming code.

Rather, conventional smart cards merely store security keys which are exported to the trusted machine during the security routine used to authenticate the new code. Thus, the trusted machine, not the smart card, performs the security routine. Such a process requires that the smart card export proprietary security keys. Once exported, the smart card loses control over the keys, thereby creating a number of additional opportunities for hackers to breach the card's security.

SUMMARY OF THE INVENTION

The present invention provides a system and method by which ROM based programming may be securely and effectively modified, amended, or replaced in the field. Such replacement may be done via non-secure medium.

In one aspect, the present invention provides a smart card comprising; a microprocessor and a memory, the memory including a ROM and a read/write memory, and storing at least a ROM management record, an operating system (OS), and an application. Further, the read/write memory stores a ROM management record address indicator identifying the location in memory for the ROM management record. The ROM management record may be stored in ROM or in read/write memory.

In a related aspect, the ROM management record address indicator is stored in a global data object reserve space of the read/write memory.

In another aspect, the present invention provides a method of patching ROM based programming in a smart card memory, where the memory includes a ROM and read/write memory. The method stores an initial ROM management record in memory, and stores a ROM management record address indicator in read/write memory identifying a location in memory for the initial ROM management record. Further, the method patches ROM based programming, and after patching ROM based programming stores a new ROM management record in read/write memory, and updates the ROM management record address indicator to identify a location in read/write memory for the new ROM management record.

In yet another aspect, the present invention provides a method of patching ROM based programming in a smart card comprising a microprocessor and a memory, the memory comprising a ROM and read/write memory, the memory storing an initial ROM management record, and the read/write memory storing a ROM management record address indicator identifying a location in memory for the initial ROM management record. The method comprises; downloading an application implementing the patch to the read/write memory, installing the application in read/write memory, and executing the application to patch ROM based programming.

Further, when executing the application to patch ROM based programming the method comprises; creating patch code to modify the ROM based programming, creating a new ROM management record in read/write memory to replace the initial ROM management record, and updating the ROM management record address indicator to identify a location in read/write memory for the new ROM management record.

ROM management record identifies a location in ROM for the API.

BRIEF DESCRIPTION OF THE DRAWINGS

FIG. 4 illustrates the software/hardware relationship of a smart card according to one aspect of the present invention.

DETAILED DESCRIPTION

Figure 1:
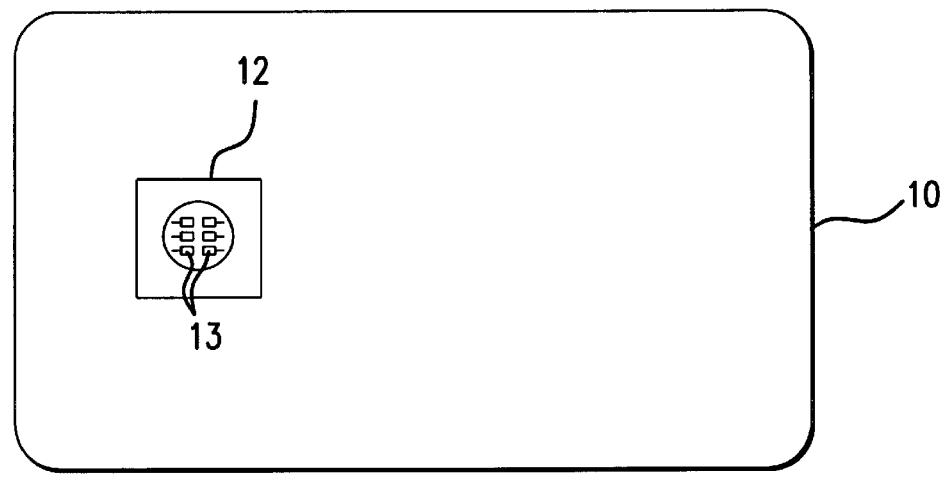
FIG. 1 shows an exemplary smart card.
Figure 2:
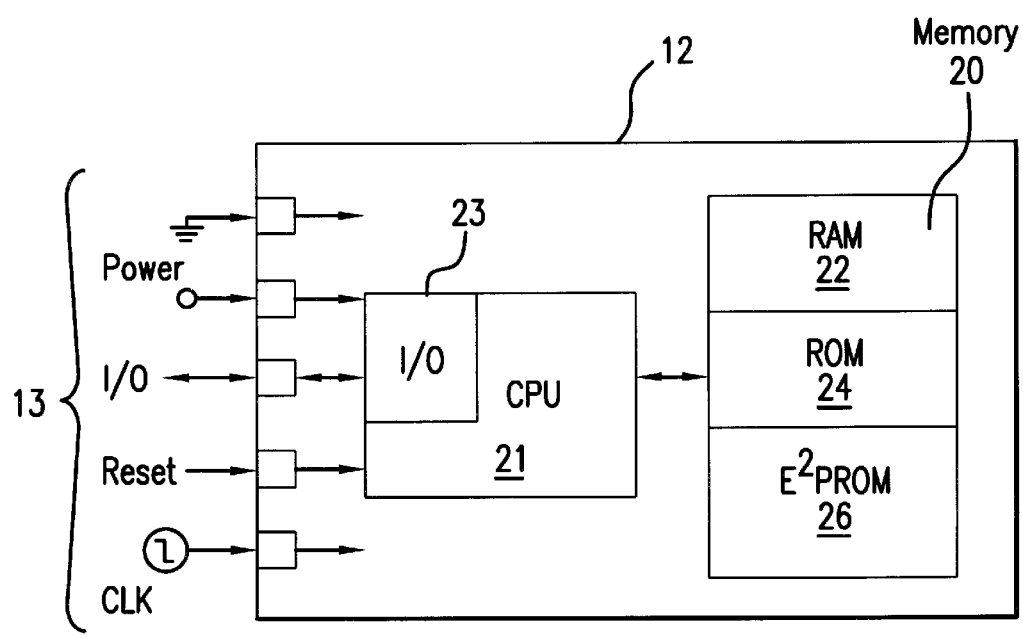
FIG. 2 shows the integrated circuit portion of the exemplary smart card of FIG. 1 in some additional detail.
Figure 3A:
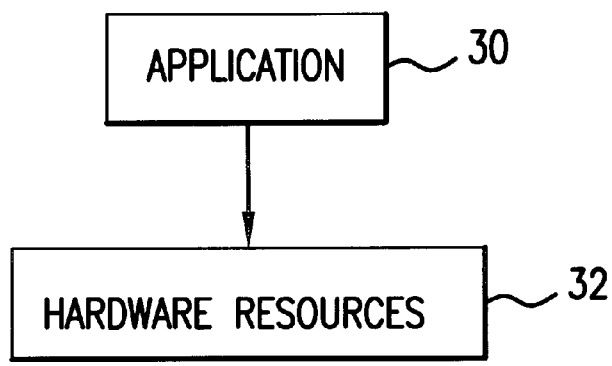
FIG. 3A illustrates the software/hardware relationship of a conventional, first generation smart card.
Figure 3B:
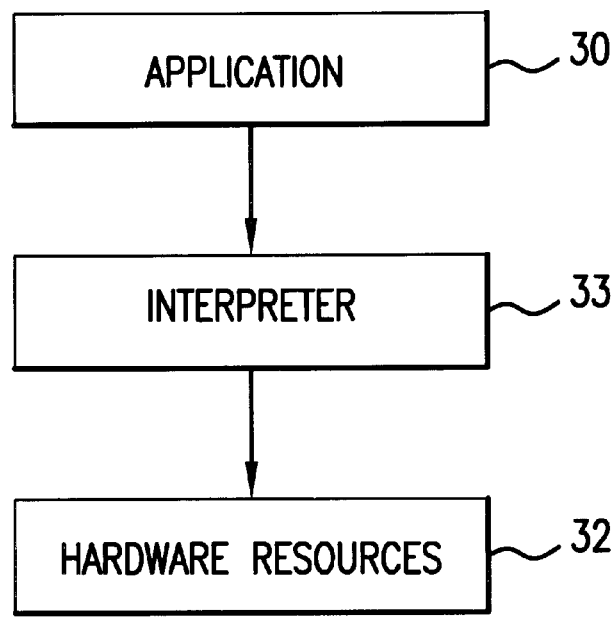
FIG. 3B illustrates the software/hardware relationship of a conventional, second generation smart card.

The present invention contemplates the use of ROM based programs in a smart card. At presently preferred, ROM provides a cost effective and stable storage medium for smart card programs. Accordingly, the examples given below are presented in the context of ROM based programs. This preference for using conventional ROM as a storage medium for certain smart cards programs may change in the future with the advent of cheap, space efficient flash memory or similar read/write storage medium.

The present invention also contemplates the use of a true operating system (OS). In addition to the OS, smart cards particularly well adapted to the present invention may also include an application programming interface (API) and/or a hardware abstraction layer (HAL). Like the OS, the API and HAL are preferably stored in ROM. The use and cooperation of the API and HAL with the OS are the subject of U.S. patent application No. 09/386,287 filed Aug. 31, 1999 and commonly assigned to the present assignee. The subject matter of this application is incorporated by reference herein.

The present invention further contemplates the ability to download and install programming code in the field. The downloading, installation and de-installation of programming code in a smart card are the subject of U.S. patent application No. 09/386,288 filed Aug. 31, 1999 and commonly assigned to the present assignee. The subject matter of this application is incorporated by reference herein.

In one aspect, the present invention uses the ability to download and install new "applications" as a mechanism by which ROM based programming may be modified or replaced. To more fully describe this aspect, reference is made to FIG. 4. Within FIG. 4 ROM 40 stores an OS 41, an API 42, A HAL 43, and an application 44. ROM 40 also stores an initial ROM management record 45.

Like other ROM based programs, initial ROM management record 45 is placed (or masked) into ROM during manufacture. Initial ROM management record 45 indexes the programs in ROM. For example, initial ROM management record 45 may be a vector table storing the start addresses for each program in ROM, but might be any other convenient record or algorithm.

The initial ROM management record 45 is identified by a ROM management record address indicator 47 stored in the global data object reserve space in Read/Write memory 50. Upon first initialization of the smart card, this global data object reserve space is defined within Read/Write memory 50 as part of a routine which defines the starting environment for the smart card. During this routine, the ROM management record address indicator 47 is set to a default value. The default value indicates a location in ROM at which the initial ROM management record 45 may be found.

Alternatively, the ROM management record address indicator 47 may be a data record having the appropriate "type" field stored in the Read/Write file directory. Such a record would first be created during smart card initialization.

The configuration of the initial ROM management record 45 and ROM management record indicator 47 persists in memory until such time as it becomes necessary to "patch" one or more of the programs stored in ROM. A process by which the present invention effectively amends or replaces a ROM based program, or a portion of a ROM based program, such as the OS, API, and HAL or ROM based applications is referred to as patching. Patching is a special use of the present invention's general ability to download and install new programming code. All programs, records, and data objects stored in Read/Write memory may be readily replaced by downloading new code, and installing the new code in place of the old.

Patching differs in the sense that the code being replaced is permanently stored in ROM and, thus, can not be conveniently overwritten in or deleted from memory. Rather, in one aspect of the present invention, ROM based programming code is replaced by code downloaded into Read/Write memory and by the creation of a new ROM management record 49 in Read/Write memory which replaces the initial ROM management record 45.

Figure 5:
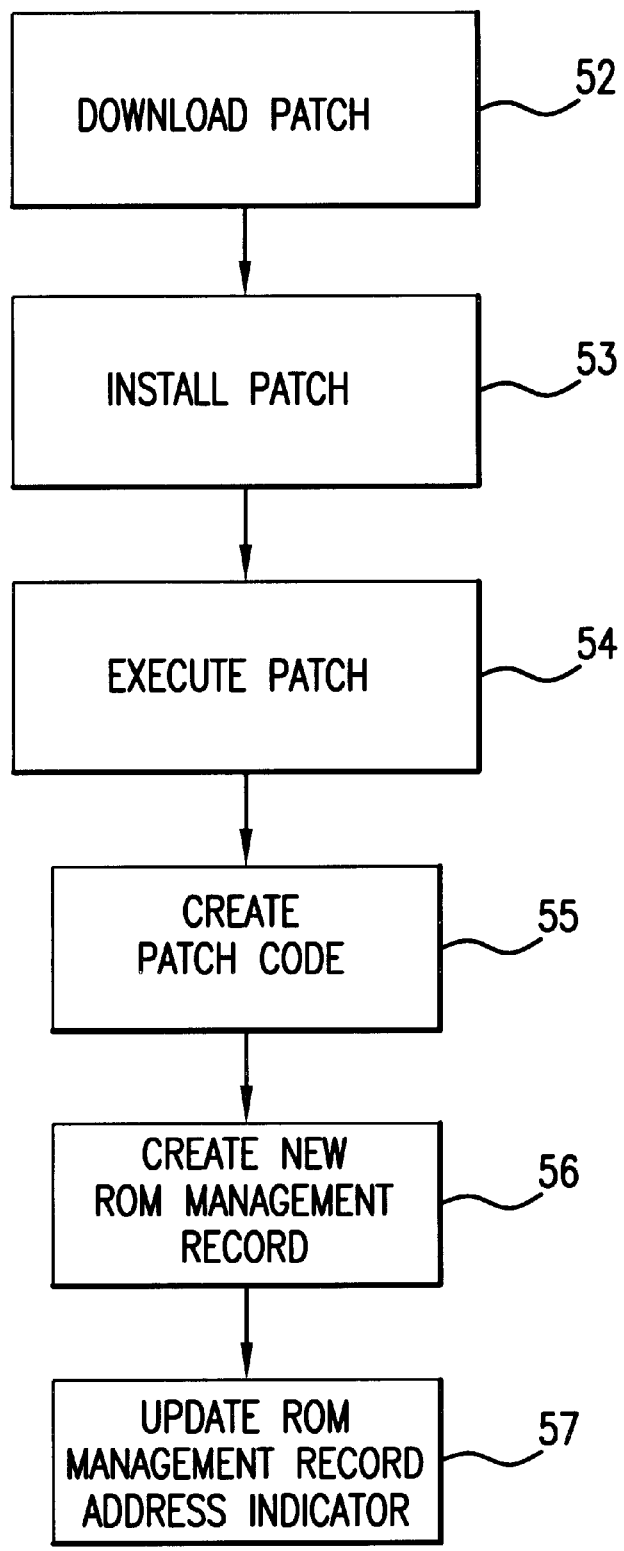
FIG. 5 illustrates the software/hardware relationship of a smart card according to another aspect of the present invention.

Specifically, FIG. 5 shows an exemplary routine by which a ROM based program is modified in the present invention. First, a patch is downloaded 52 and installed 53 like any other new piece of programming code. The patch may be authenticated in this process to ensure programming code integrity.

Since patches are "one-time" use applications, and as such do not return a persistent command table. Rather, once installed the patch is executed 54. When executed, the patch creates patch code in Read/Write memory 55, creates a "new" ROM management record 56, and updates the ROM management record indicator 57 to accurately reflect the location of the new ROM management record in Read/Write memory.

Returning to FIG. 4, the routine illustrated in FIG. 5 will be further explained in the context of a specific example. In the example, it is assumed that the smart card issuer requires that original API 42 be replaced with a new API in order to more effectively implement additional OS functions. As originally configured at the manufacturer, the original API 42 is stored in ROM and indexed in the initial ROM management record 45, also stored in ROM.

When the new API patch code is downloaded, installed and executed, a new API 51 is created and stored in Read/Write memory 50. Further, a new ROM management record 49 is created in Read/Write memory 50. Since each of these data objects are intended to be persistent in memory, each must be associated with a data record in file directory 48. Finally, the ROM management record address indicator 47 stored in the global data object reserve space is updated to reflect the presence of the new ROM management record 49 in Read/Write memory.

Once the ROM management record address indicator 47 has been updated, all queries to the ROM management record will be made to the new ROM management record 49 rather than the initial ROM management record 45. In the example, the new ROM management record 49 would contain exactly the information found in the initial ROM management record, with the exception of the information relating to the API. Now, instead of referencing the ROM address of the original API 42, the new ROM management record 49 references the address of the new API 51 stored in Read/Write memory. This change in reference or index effectively replaces the original API code with the new API code. The old code is "cut-off," absent another change to the ROM management record.

Thus, unlike the filtering approach described in the prior art, the actual ROM based code may be completely and effectively replaced in memory, and not merely supplemented. By use of the secure download and install capabilities in the present invention, Rom based programming may be amended, corrected, or replaced in the field via an un-secure medium.

Unlike the filtering approach described in the prior art, the actual ROM based programming code is completely replaced in memory by the present invention. Since the patch code can be authenticated during its download and installation, programming code integrity may be assured. Further, the download/installation authentication capability of the present invention allows ROM based programming code to be patched through any terminal in the field. There is no need to rely on a trusted machine. Non-secure media such as the Internet may be used. Further, different application vendors may patch their proprietary programming code without sharing code information with the OS provider, and without threatening the integrity of other applications stored in the smart card.

All forms of ROM based programming including the OS, an API, a HAL, an interpreter, or an application may be patched using the present invention. Multiple patches may be made to ROM based programming code without any loss in code coherency. The code implementing the ability to patch ROM based programming in the present invention is preferably stored as a callable function, or a patch manager, within the smart card OS. The patch manager, like any other OS function, may be revised or replaced by a patch.

The present invention provides a real ability to fix programming bugs in the field. The smart card user need not be aware of the patching process. It may be done as part of a routine smart card transaction. With an ability to effectively modify or replace all smart card programming code in the field, the risk of fielding new smart card software is greatly reduced.

The present invention has been explained with reference to several examples and within the context of presently preferred embodiments. The present invention is not limited to the teaching examples or context, but is defined by the attached claims.

What is claimed is:

1. A smart card comprising:
   a microprocessor and a memory; the memory comprising a ROM and a read/write memory; wherein
   the memory stores a ROM management record,
   the ROM stores at least an operating system (OS) and an application, and
   the read/write memory stores a ROM management record address indicator identifying the location in memory for the ROM management record.

2. The system of claim 1, wherein the ROM management record is stored in ROM.

3. The system of claim 1, wherein the ROM management record is stored in read/write memory.

4. The system of claim 1, wherein the ROM further stores at least one of an Application Programming Interface (API) and a Hardware Applications Layer (HAL).

5. The system of claim 4, wherein the ROM management record identifies a location in ROM for the at least one API and HAL.

6. The system of claim 5, wherein the ROM management record is a vector table identifying respective locations in ROM for the OS, the API, and the HAL.

7. The system of claim 1, wherein the ROM management record address indicator is stored in a global data object reserve space in read/write memory.

8. A method of patching ROM based programming in a smart card comprising a microprocessor and a memory, the memory comprising a ROM and read/write memory, the method comprising:
   storing an initial ROM management record in memory;
   storing a ROM management record address indicator in read/write memory identifying a location in memory for the initial ROM management record;
   patching ROM based programming;
   after patching ROM based programming, storing a new ROM management record in read/write memory, and updating the ROM management record address indicator to identify a location in read/write memory for the new ROM management record.

9. The method of claim 8, wherein storing an initial ROM management record in memory comprises storing an initial ROM management record in ROM.

10. The method of claim 9, wherein the ROM stores an operating system (OS), and wherein the ROM management record identifies a location in ROM for the OS.

11. The method of claim 10, wherein the OS implements a plurality of OS functions, and wherein the ROM management record identifies a respective location in ROM for each one of the OS functions.

12. The method of claim 11, wherein the ROM further stores an Application Programming Interface (API) indexing at least one of the OS functions, and wherein the ROM management record identifies a location in ROM for the API.

13. The method of claim 10, wherein the ROM further stores a Hardware Application Layer (HAL), and wherein the ROM management record identifies a location in ROM for the HAL.

14. A method of patching ROM based programming in a smart card comprising a microprocessor and a memory, the memory comprising a ROM and read/write memory, the memory storing an initial ROM management record, and the read/write memory storing a ROM management record address indicator identifying a location in memory for the initial ROM management record;
   downloading an application implementing the patch to the read/write memory;
   installing the application in read/write memory;
   executing the application to patch ROM based programming.

15. The method of claim 14, wherein executing the application to patch ROM based programming comprises:
   creating patch code to modify the ROM based programming;
   creating a new ROM management record in read/write memory to replace the initial ROM management record; and
   updating the ROM management record address indicator to identify a location in read/write memory for the new ROM management record.

16. The method of claim 15, wherein installing the application in read/write memory comprises authenticating the application.

17. The method of claim 16, wherein authenticating the application comprises confirming a digital security signature associated with the downloaded application.

18. The method of claim 17, wherein the ROM stores an operating system (OS), and wherein the ROM management record identifies a location in ROM for the OS.

19. The method of claim 18, wherein the OS implements a plurality of OS functions, and wherein the ROM management record identifies a respective location in ROM for each one of the OS functions.

20. The method of claim 19, wherein the ROM further stores an Application Programming Interface (API) indexing at least one of the OS functions, and wherein the ROM management record identifies a location in ROM for the API.

* * * * *